United States Patent
Mattera

[11] Patent Number: 5,215,763
[45] Date of Patent: Jun. 1, 1993

[54] WATER RING PELLETIZER

[75] Inventor: Philip J. Mattera, Beverly, Mass.

[73] Assignee: John Brown Inc., Warwick, R.I.

[21] Appl. No.: 711,923

[22] Filed: Jun. 7, 1991

[51] Int. Cl.⁵ .............................................. B29B 9/00
[52] U.S. Cl. ................... 425/311; 264/142; 425/313; 425/DIG. 230
[58] Field of Search ............ 425/311, 313, 67, 68, 425/71, 8, DIG. 230, 202; 264/142, 237

[56] References Cited

U.S. PATENT DOCUMENTS

| | | | |
|---|---|---|---|
| 2,850,764 | 9/1958 | Evans et al. | 425/313 |
| 3,196,487 | 7/1965 | Snelling | 425/313 |
| 3,230,582 | 1/1966 | Hoffman et al. | 425/313 |
| 3,287,764 | 11/1966 | Swickard, Jr. et al. | 425/313 |
| 3,324,510 | 6/1967 | Kleeb | 425/313 |
| 3,341,892 | 9/1967 | Mayner | 425/313 |
| 3,415,917 | 12/1968 | Watanabe et al. | 264/142 |
| 4,021,176 | 5/1977 | Dettmer et al. | 425/313 |
| 4,046,497 | 9/1977 | Newman, Jr. | 425/313 |
| 4,099,900 | 7/1978 | Bradbury et al. | 425/313 |
| 4,150,595 | 4/1979 | Loffler et al. | 83/171 |
| 4,245,972 | 1/1981 | Anders | 425/67 |
| 4,249,879 | 2/1981 | Anders et al. | 425/311 |
| 4,285,652 | 8/1981 | Anders | 425/311 |
| 4,300,877 | 11/1981 | Andersen | 425/67 |
| 4,385,016 | 5/1983 | Gwinn | 264/142 |
| 4,385,884 | 5/1983 | Pecci | 425/313 |
| 4,401,421 | 8/1983 | Anders | 425/313 |
| 4,410,306 | 10/1983 | Anders et al. | 425/313 |

Primary Examiner—David A. Simmons
Assistant Examiner—William J. Matney, Jr.

[57] ABSTRACT

A pelletizer for liquid polymers in which the severed pellets fall from cutter knives into an annulus on the surface of a body of cooling liquid. The annulus is defined by said surface and the confluence of a downwardly flowing ring of the cooling liquid and a downwardly and radially outwardly flowing cascade of the cooling liquid. The velocity and trajectory of the pellets are controlled by the projection of a spray of cooling liquid radially across the dies from which the pellets are severed. Band heaters in proximity to the dies maintain the polymer in a liquid state prior to extrusion.

6 Claims, 3 Drawing Sheets

WATER RING PELLETIZER

SUMMARY OF THE INVENTION

This invention relates generally to apparatus for converting liquid polymers into pellet form. More particularly, it relates to pelletizers in which the severed pellets fall from cutter knives into a cooling liquid, generally water, as distinguished from underwater pelletizers in which polymer is extruded from dies directly into a body of water in which the pellets are severed.

So-called "water ring pelletizers" have been developed, in which water is projected downwardly over the inner surface of a cylinder or similar structure forming a cooling chamber, forming an annular curtain or ring of cooling water. Prior to extrusion the polymer is maintained at an elevated temperature to preserve its fluidity. Die plates are formed with annularly spaced dies, and cutter means are rotated over the dies to sever the pellets, imparting to them a downwardly and radially outwardly directed trajectory. Upon leaving the cutting knives the pellets fall at uniformly spaced intervals, impinging upon the water ring. If the pellets do not ricochet before being wetted by the cooling liquid, they cool sufficiently to prevent agglomeration with other pellets. However, if they ricochet, intersecting trajectories are produced which, if the hot pellets collide, results in undesirable agglomerations. Apparatus downstream of the pelletizer is adapted to dewater and dry the pellets, but it may be necessary to trap and remove some agglomerations as undesirable inclusions.

In typical water ring pelletizers, the speed of operation and the relatively small volume within the water ring configuration often cause the closely spaced pellets to ricochet, and accordingly efforts have been devoted to the perfection of water ring configurations that more effectively intercept and cool the falling pellets. A principal object of this invention is to make further improvements upon such pelletizers through the provision of novel cooling liquid configurations.

Another object is to provide cooling liquid means for altering the velocity and trajectory of the severed pellets to direct them into regions where the likelihood that they will ricochet and the probability of collision with other pellets are minimized.

Still another object is to improve the pellet extrusion apparatus to ensure that the polymer remains in a liquid state as it passes through the dies.

With the above and other objects hereinafter appearing in view, the features of this invention include a pelletizer in which the severed pellets fall into an annulus on the surface of a body of cooling liquid within a cone shaped collection funnel. The annulus is defined by the confluence at said surface of a downwardly flowing ring of the cooling liquid and a downwardly and radially outwardly flowing cascade of the cooling liquid. Approaching this annulus, the falling pellets are substantially surrounded by cooling liquid. Thus the likelihood of collision and agglomeration is substantially reduced.

According to another feature, the trajectory of the pellets is directed downwardly and radially outwardly from the rotating cutter knives under the joint action of the knives and a spray of cooling liquid that is projected radially across the orifices of the dies. This liquid not only serves to impart cooling to the pellets but alters their trajectory in a controlled manner, directing them into the above-mentioned annulus with precision.

Band heaters surrounding and in close proximity to the dies maintain the polymer at a controlled temperature for optimal pellet formation.

DETAILED DESCRIPTION

Figure 1:
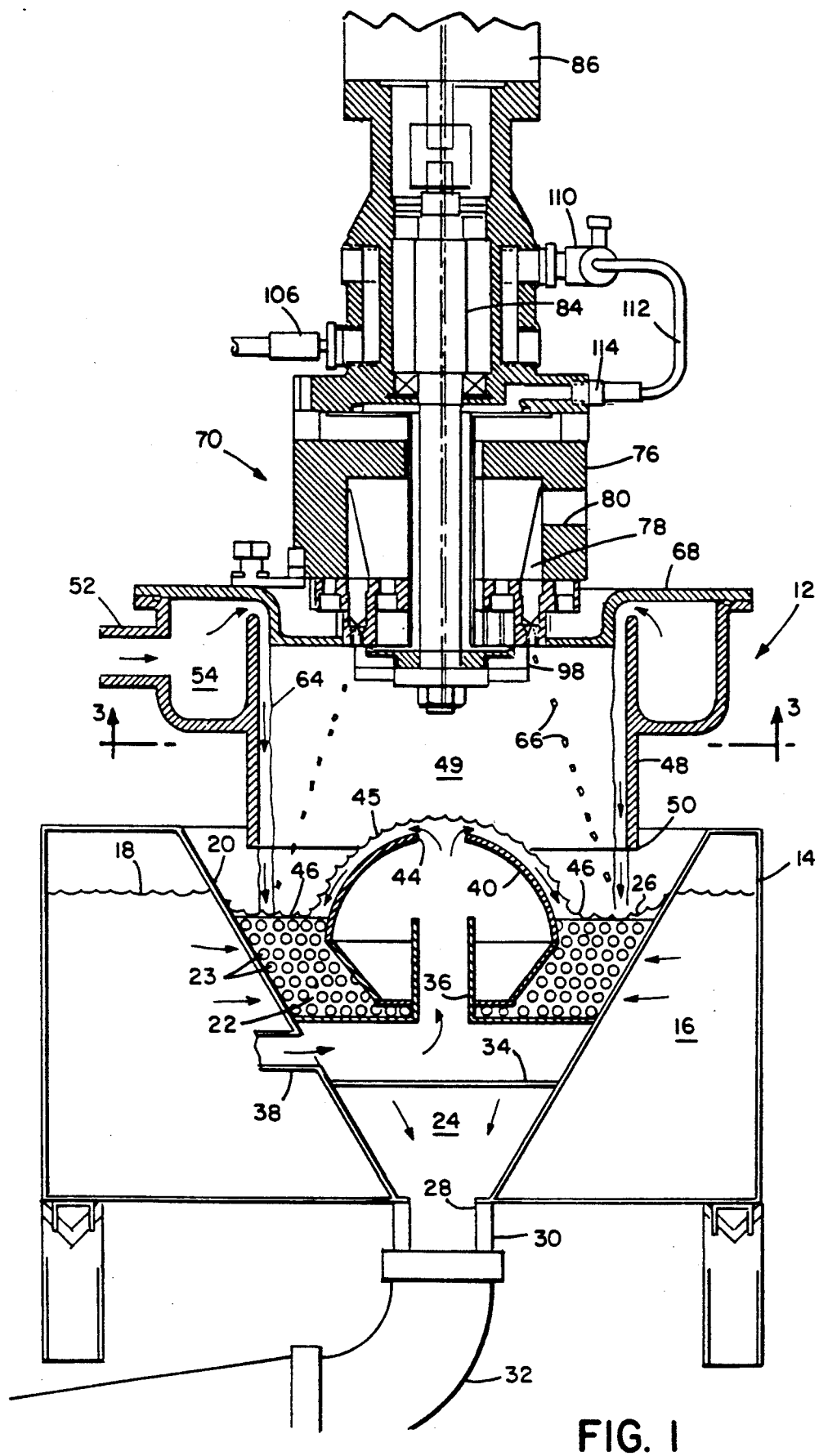
FIG. 1 is an elevation in section of the presently preferred embodiment of the invention.

A water ring pelletizer according to this invention is shown generally at 12. The parts are supported within a tank 14 for holding a body 16 of cooling water having a surface 18. The level of this surface is maintained during operation by suitable means such as a float valve (not shown).

Within the tank is supported a permeable, inverted frustoconical collection funnel 20 formed of sheet metal and having one or more perforated windows 22 extending around all or a major portion of its circumference. The windows 22 are formed with a pattern of closely spaced small holes 23 through which water may pass rapidly from the body 16 into a second body 24 of cooling liquid within the funnel. The perforations in the windows are located below the level of the surface 18. By this means the surface 26 of the body 24 is constantly maintained at a predetermined level. The base of the funnel 20 is connected through an aperture 28 in the bottom of the tank 14 to a fitting 30, this fitting being connected to a duct 32 extending to dewatering and drying apparatus of the types commonly in use.

A duct 34 extending transversely through the wall of the funnel 20 and communicating with an axial extension 36 has a fitting 38 for connection to a source of cooling water under controlled pressure (not shown). A hollow metallic dome 40 of substantially hemispherical shape is supported by the duct extension 36. The dome is preferably formed of sheet metal with an axial circular aperture 44 through which cooling water flows upwardly. This cooling water then flows uniformly downwardly and radially outwardly over the external surface of the dome 40 in a continuous sheet or cascade 45 that impinges on the water surface 26. The confluence of the cascade 45 and the surface 26 occurs in a circular shaped region hereinafter referred to as annulus 46.

A cylinder 48, combining with the collection funnel 20 to define a cooling chamber 49, is suitably supported over the tank 14 with an open end 50 suspended over the water surface 26 within the funnel 20. At the top of the cylinder a fitting 52 is provided for connection to a source of cooling water under pressure (not shown). The fitting 52 is connected with an annular space 54. Through this space a continuous annular curtain or ring 64 of cooling water is projected downwardly along the inner surface of the cylinder 48 and into the body of water 24 at the annulus 46.

As shown, the water ring 64 and cascade 45 provide substantially continuous sheets of cooling liquid converging at the annulus 46 on the surface 26, whereby pellets 66 formed as hereinbelow described and directed to fall into this annulus are progressively enveloped and finally fully wetted by the cooling water.

Figure 2:
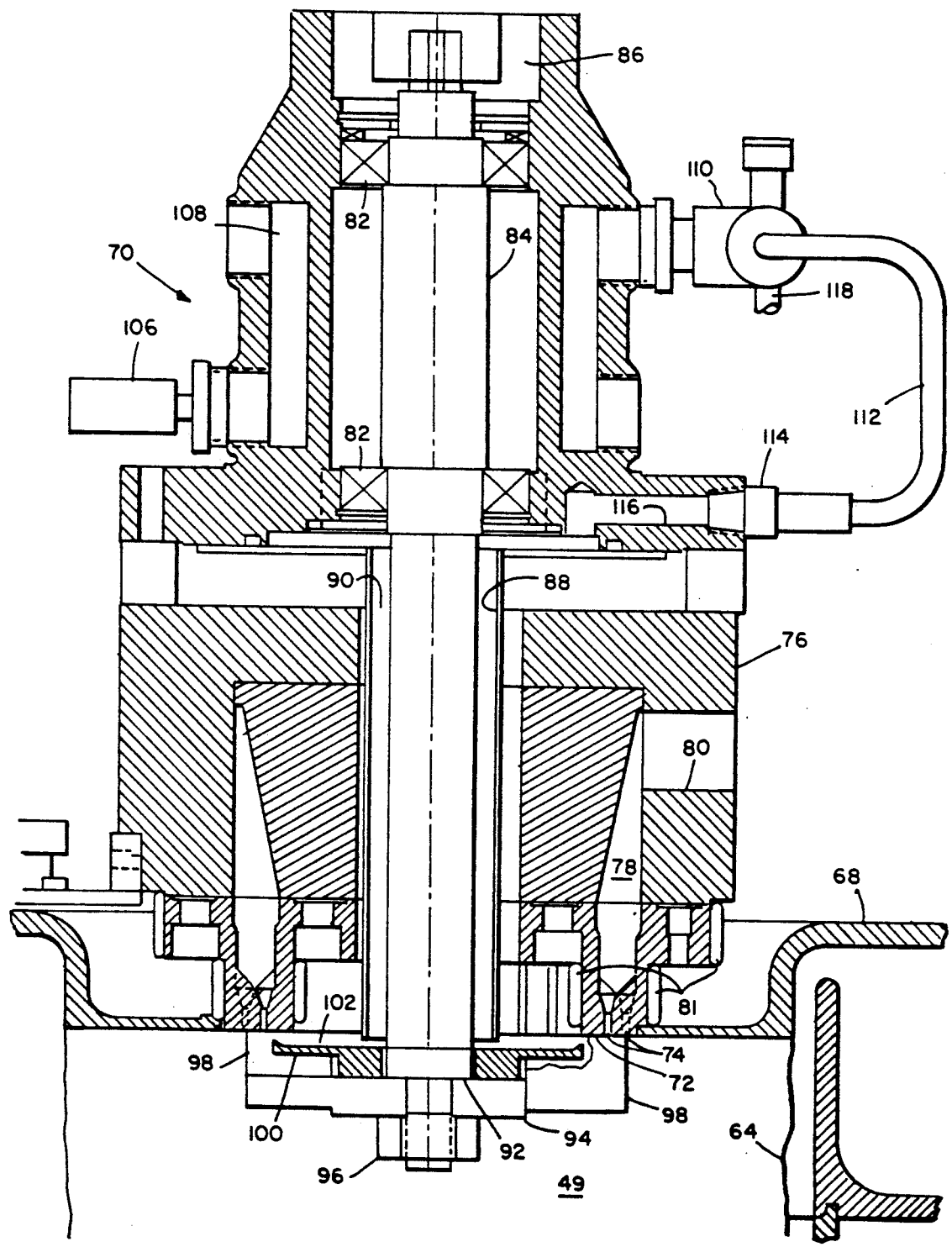
FIG. 2 is an enlarged elevation in section of the extruder portion of the pelletizer.
Figure 3:
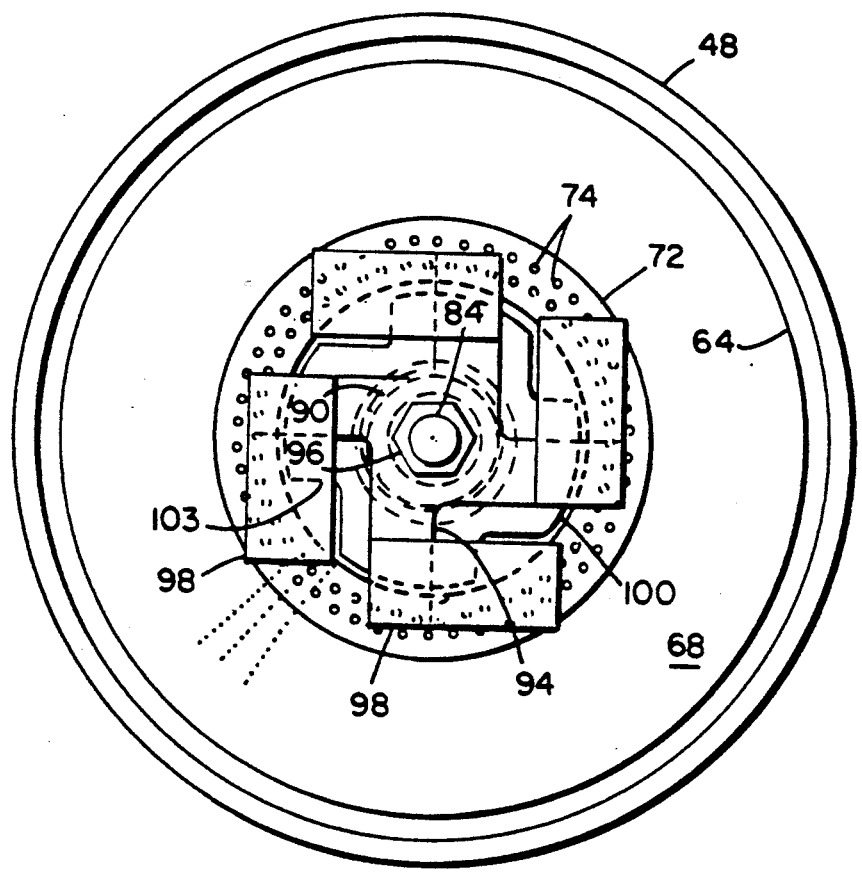
FIG. 3 is a view in plan of the cutter knives and related parts, taken on line 3—3 of FIG. 1.

The cylinder 48 is provided with a cover 68 supported by parts of the pellet extruder shown generally at 70. The extruder has a die plate 72 (FIG. 2) supported in an aperture on the cover 68 and formed with a plurality of annularly spaced dies 74. A body 76 is secured to the die plate and has an annular interior space 78 communicating with the dies 74. An opening 80 in the wall of the body 76 is adapted for connection to a source of liquid polymer under pressure (not shown). Three band heaters 81, each having an electrical resistance winding in generally cylindrical form, are mounted around or within the die plate 72 in close proximity to the dies 74. Sufficient heat is produced by these heaters to maintain the polymer at the optimum temperature and viscosity for extrusion and pellet formation.

The upper part of the body 76 has bearings 82 for a shaft 84 extending to a drive motor 86. The shaft 84 extends downwardly through and in spaced relation to a sleeve 88 defining a cylindrical space 90 surrounding the shaft. The shaft 84 projects downwardly below the die plate 72 and is formed with a shoulder 92. A knife holder 94 is fitted over the end of the shaft against this shoulder and is retained by a threaded nut 96. Four rectangular pellet cutting knives 98 are secured to the knife holder in inclined positions to bear slidably upon an annular surface of the die plate 72 containing the dies 74. The knife holder is also adapted to retain a circular disk shaped water slinger 100 between the knife holder and the die plate. The upper surface of the water slinger is supported in spaced relation to the lower surface of the die plate to form an annular space 102. The die plate has four cutouts or notches 103 around its periphery to allow space for the inclined knives 98.

Cooling water is projected in a spray radially across the orifices of the dies 74 from the space 102 by the water slinger 100. The water supply for this purpose is described as follows. An adjustable volumetric flow rate controller 106, of conventional form and mounted on the body 76 is connected with an annular space 108 in the body. This space is connected by a two-way valve 110 with a tube 112. The tube 112 is connected by a fitting 114 with a radial passage 116 in the body communicating with the space 90. Cooling water passes continuously through the annular space 108 to cool the bearings 82. Under normal operating conditions the valve 110 is set to direct the flow to the slinger 100 through the space 90. If the operation of the pelletizer is interrupted the valve 110 is set to discharge the cooling water through a pipe 118, thus permitting the bearings 82 to be cooled during the period of interruption. The controller 106 is adjusted to control the rate of flow of the water spray past the orifices of the dies 74, and thereby the trajectory of the pellets.

In the foregoing manner, the combined action of the cutting knives 98 and the spray from the water slinger 100 determines and controls the radial velocity and trajectory of the severed pellets. In use, the trajectory is adjusted so that the pellets are uniformly directed into the annulus 46 as previously described.

The action of the cooling water sprayed across the dies also aids in cooling the severed pellets and reducing the possibility of their adhesion to the cutting knives 98.

In operation, cooling water is continuously pumped through the fittings 38 and 52 and the controller 106 as liquid polymer is supplied through the annular space 78 to the extrusion dies 74. The motor 86 rotates the shaft 84 at a constant, controlled velocity.

As previously mentioned, the volumetric rate of flow through the controller 106 is adjusted in conjunction with the angular speed of the cutter knives to impart the desired trajectory to the pellets 66, causing them to impinge on the surface 26 of the cooling body 24 at the annulus 46. The rate of flow through the fitting 52 is controlled to provide a water ring 64 that is continuous about the inner surface of the cylinder 48. The rate of flow through the fitting 38 is controlled to provide a cascade 45 that is continuous over the surface of the dome 40.

Water and entrained pellets form a slurry which is continuously withdrawn from the funnel 20 through the duct 32. The rate of addition of water to the funnel through the fittings 38 and 52 and the controller 106 is generally less than the rate at which water is withdrawn through the fitting 30. However, this does not result in lowering the level of the surface 26 because this level is continuously maintained by water flowing from the body 16 to the body 24 through the perforations 23 in the windows 22. Accordingly, the pelletizer of this invention permits a wide range of control of cooling water supplied to the several fittings, permitting the attainment of closely controlled flow conditions and operational efficiency, independently of the rate of flow of the slurry through the discharge duct 32.

I claim:

1. A polymer pelletizer comprising, in combination,
   a tank having cooling liquid supply means for maintaining a first body of said liquid therein at a first surface level,
   a collection funnel supported in the tank, having a discharge aperture and a wall with perforations located below said first surface level,
   means to withdraw liquid from said aperture at a rate sufficient to maintain a continuous flow of liquid from said first body through said perforations to maintain a second body of said liquid within the funnel at a predetermined second surface level,
   a member having a closed wall extending upwardly in the space above said second body,
   means to project a ring of cooling liquid downwardly within said closed wall, said member being formed to cause said ring to fall in an annulus upon the liquid surface in the funnel,
   pellet forming means comprising cutter means located above said second surface level and within said closed wall and rotatable to form pellets from liquid polymer, and
   means to rotate the cutter means to impart a trajectory to the pellets extending downwardly and radially outwardly into said annulus.

2. A pelletizer according to claim 1, including
   a dome supported in the funnel and having a downwardly and outwardly sloping surface symmetrically formed about the rotational axis of the cutter means, and
   means projecting cooling liquid over the surface of the dome, said dome being formed to produce a cascade of liquid flowing radially outwardly from said axis and downwardly over said sloping surface into said annulus.

3. A pelletizer according to claim 2 in which the dome has an aperture and said means projecting cooling liquid supplies said liquid under pressure to the interior of the dome.

4. A pelletizer according to claim 1, in which said funnel wall is formed with an array of mutually spaced perforations extending around the funnel.

5. A pelletizer according to claim 1, in which the pellet forming means comprise a die plate formed with annularly spaced dies and the cutter means are adapted to impart radial velocity to the pellets.

6. A pelletizer according to claim 1, in which the pellet forming means comprise a die plate formed with annularly spaced dies, and including
 means to project a spray of cooling liquid radially across said dies to impinge on the pellets.

* * * * *